(12) United States Patent
Sandadi et al.

(10) Patent No.: US 9,201,810 B2
(45) Date of Patent: Dec. 1, 2015

(54) MEMORY PAGE EVICTION PRIORITY IN MOBILE COMPUTING DEVICES

(75) Inventors: Upender R. Sandadi, Issaquah, WA (US); Javier N. Flores Assad, Bothel, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 13/359,376

(22) Filed: Jan. 26, 2012

(65) Prior Publication Data

US 2013/0198435 A1 Aug. 1, 2013

(51) Int. Cl.
G06F 12/12 (2006.01)
G06F 12/02 (2006.01)

(52) U.S. Cl.
CPC .......... *G06F 12/126* (2013.01); *G06F 12/0246* (2013.01); *G06F 2212/7211* (2013.01)

(58) Field of Classification Search
USPC .................................. 711/143, 173, 133, 156
See application file for complete search history.

(56) References Cited

U.S. PATENT DOCUMENTS

| 5,479,639 | A | 12/1995 | Ewertz et al. | |
|---|---|---|---|---|
| 6,963,957 | B1 | 11/2005 | Kundu et al. | |
| 8,447,948 | B1* | 5/2013 | Erdogan et al. | 711/173 |
| 2005/0281469 | A1* | 12/2005 | Anderson et al. | 382/232 |
| 2006/0092165 | A1* | 5/2006 | Abdalla et al. | 345/545 |
| 2007/0124568 | A1* | 5/2007 | Kra | 712/226 |
| 2007/0294494 | A1 | 12/2007 | Conti et al. | |
| 2008/0189495 | A1 | 8/2008 | McBrearty et al. | |
| 2009/0182949 | A1* | 7/2009 | Begon et al. | 711/133 |
| 2010/0064107 | A1* | 3/2010 | Eddy et al. | 711/146 |
| 2010/0095075 | A1 | 4/2010 | Ganesh et al. | |
| 2010/0199043 | A1* | 8/2010 | Sechrest et al. | 711/118 |
| 2010/0332727 | A1 | 12/2010 | Kapil et al. | |
| 2011/0082965 | A1 | 4/2011 | Koka et al. | |
| 2011/0145506 | A1* | 6/2011 | Cherukuri et al. | 711/130 |
| 2011/0153975 | A1* | 6/2011 | Accapadi et al. | 711/170 |
| 2012/0198202 | A1* | 8/2012 | Arndt et al. | 711/173 |
| 2012/0246411 | A1* | 9/2012 | Birka et al. | 711/133 |
| 2012/0311269 | A1* | 12/2012 | Loh et al. | 711/133 |
| 2013/0031292 | A1* | 1/2013 | Van Riel | 711/6 |
| 2013/0054922 | A1* | 2/2013 | Tuch et al. | 711/170 |
| 2013/0075803 | A1* | 3/2013 | Edrei et al. | 257/315 |

OTHER PUBLICATIONS

Peiquan Jin, Yi Ou, Theo Härder, Zhi Li, Ad-Lru: An efficient buffer replacement algorithm for flash-based databases, available online—Oct. 7, 2011, Published by Elsevier, Data and Knowledge Engineering, pp. 83-102.*

Saxena, et al., "FlashVM: Virtual Memory Management on Flash", In Proceedings of USENIX Conference on USENIX Annual Technical Conference, Jun. 2010, 14 pages.

* cited by examiner

*Primary Examiner* — Cheng-Yuan Tseng
*Assistant Examiner* — Kamal Dewan
(74) *Attorney, Agent, or Firm* — Sunah Lee; Judy Yee; Micky Minhas

(57) ABSTRACT

Eviction priority technologies provide for the prioritized eviction of memory pages from a first memory, such as a DRAM, in a mobile computing device that have been copied from a second memory, such as flash memory. Eviction priority is based on eviction costs for the memory pages. The eviction cost for a page is based on page-in costs, page-out costs, the priority of a process associated with the page, page access probability and combinations thereof. Page-in costs include read costs, fixup costs and decompression costs, and page-out costs include write-back costs and compression costs. Page lists allow for the sorting of pages by page type (e.g., read only, read/write) and can be used to keep track of eviction costs. Pages are evicted from the first memory in order of increasing eviction cost.

20 Claims, 9 Drawing Sheets

MEMORY PAGE EVICTION PRIORITY IN MOBILE COMPUTING DEVICES

BACKGROUND

Mobile computing devices contain a main system memory, typically a volatile RAM, such as a DRAM, and non-volatile flash memory, primarily used for storing media (e.g., images, videos, audio files) and other data. The size of the flash memory is typically significantly larger than the size of the volatile RAM (RAM). For example, some modern smartphones have 256 MB or 512 MB of DRAM and 8 GB, 16 GB, 32 GB or more of flash memory. Lower-end mobile devices contain less RAM than their higher-end counterparts, and thus, applications that can execute on higher-end devices may not be able to execute on the lower-end devices due to RAM constraints.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Eviction priority technologies are presented that can be implemented as part of memory paging in a mobile computing device to allow flash memory to be used as an extension of the device's main memory (e.g., DRAM). The disclosed eviction priority technologies can extend the life of flash memories by reducing the number of flash write cycles.

In one embodiment, a mobile device evicts memory pages from RAM in increasing order of memory page eviction cost. Eviction costs can be based on page-in costs and the priority of a process associated with a page. Page-in costs can be based on costs associated with reading a memory page in from flash memory, fixing symbols in code pages, decompressing the page if the page was compressed when written to flash memory or combinations thereof. Eviction costs can also be based on page-out costs. Page-out costs can be based on costs associated with writing a memory page back to flash memory, compressing a page as part of writing the page to flash memory or combinations thereof.

In another embodiment, memory page lists are maintained to keep track of page eviction priority. The memory page lists include memory page entries, and the page lists have associated eviction costs. The page entries comprise a flag that indicates whether the associated memory page has a relatively greater eviction cost than pages in the page list that do not have this flag set. Memory pages that do not have this flag set in their corresponding memory page entries are evicted before memory pages in the same page list that do have the page entry flag set.

DETAILED DESCRIPTION

The tools and technologies described herein provide for the prioritized eviction of memory pages stored in a first memory of a mobile computing device. The first memory, which is typically the mobile computing device's main RAM (usually implemented in DRAM), stores memory pages that have been read in from a larger second memory, typically a flash memory. Eviction costs are determined for the memory pages and are based on various factors including page-in costs (such as read costs, symbol fixup costs and decompression costs), page-out costs (such as write-back costs and compression costs), the priority of processes associated with the memory pages, the probability that the memory pages will be accessed again and how recently the memory pages have been accessed. The tools and technologies described herein can reduce the number of flash write cycles by reducing the number of write-backs. Memory pages associated with high priority processes can be retained in the first memory longer, thereby extending flash memory lifetime and increasing application and operating system responsiveness.

Figure 1:
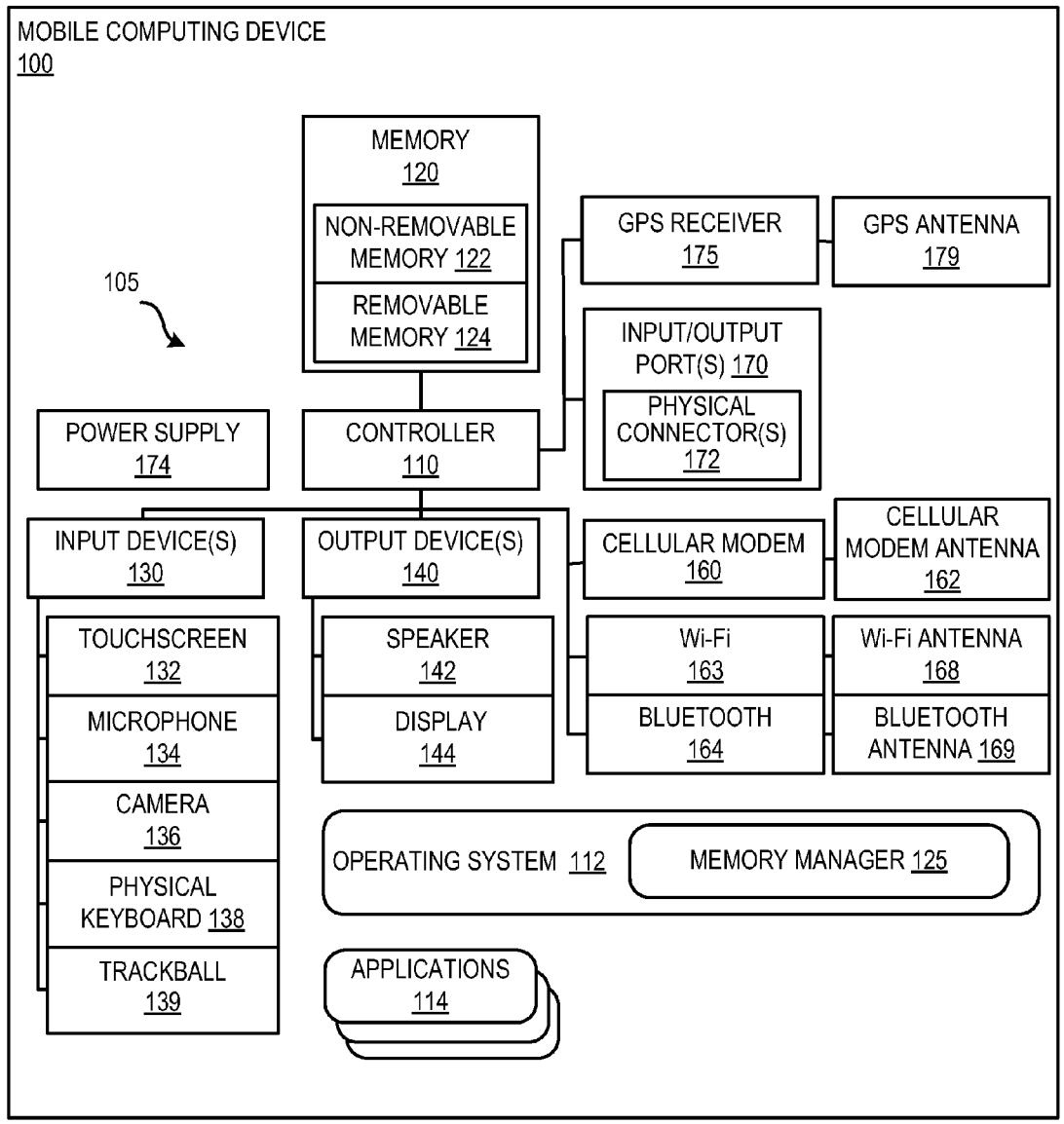
FIG. 1 is a system diagram depicting an exemplary mobile computing device.

FIG. 1 is a system diagram depicting an exemplary mobile computing device (mobile device) 100 that can be used to perform any of the methods described herein. The mobile computing device 100 can include a variety of optional hardware and software components 105. Generally, components 105 can communicate with other components, although not all connections are shown, for ease of illustration. The mobile computing device 100 can be any of a variety of mobile computing devices such as a cell phone, smartphone, handheld computer, laptop computer, notebook computer, tablet device, slate device, media player, Personal Digital Assistant (PDA), camera, video camera and can allow wired or wireless communication with one or more networks, such as a Wi-Fi, cellular or satellite network.

The mobile computing device 100 can include a controller or processor 110 (e.g., signal processor, graphics processing unit (GPU), microprocessor, ASIC, or other control and processing logic circuitry or software) for performing such tasks as memory management, signal coding, graphics processing, data processing, input/output processing, power control, and/or other functions. An operating system 112 can control the allocation and usage of the components 105 and support for one or more application programs 114. The application programs 114 can include common mobile computing applications (e.g., email applications, calendars, contact managers, web browsers, messaging applications) as well as other computing applications.

The mobile computing device 100 can include memory 120. Memory 120 can include non-removable memory 122 and removable memory 124. The non-removable, or embedded memory, 122 can include volatile RAM (e.g., SRAM, DRAM) or ROM, non-volatile flash memory, a hard drive, or other well-known memory storage technologies. In some embodiments, the device can be configured to manage the flash memory as expanded memory for the volatile memory through paging memory pages from the flash memory in and out of the first memory. The paging can be controlled by a memory manager 125, which can be part of the operating system 112.

The removable memory 124 can include flash memory cards (e.g., SD (Secure Digital) cards), memory sticks, Subscriber Identity Module (SIM) cards, which are well known in GSM (Global System for Mobile Communication) systems, or other memory storage technologies, such as "smart cards." The memory 120 can be used for storing data and/or computer-executable instructions for running the operating system 112 and the application programs 114 on the device 100. Example data can include web pages, text, images, sound files, video data or other data sets to be sent to and/or received from one or more network servers or other devices by the mobile computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can also have access to external memory (not shown) such as external hard drives. The operating system 112 can be configured to perform memory page prioritization methods described herein.

The computing device 100 can support one or more input devices 130, such as a touch screen 132, microphone 134, camera 136, physical keyboard 138 and/or trackball 139 and one or more output devices 140, such as a speaker 142 and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via wired or wireless connections. Some devices can serve more than one input/output function. For example, touchscreen 132 and display 144 can be combined in a single input/output device.

A wireless cellular modem 160 can be coupled to a cellular modem antenna 162 and can support two-way communications between the mobile computing device 100 and a mobile cellular communication network. The mobile device 100 can comprise other radio-based modems such as a Wi-Fi modem 163 or a Bluetooth modem 164, any of which can be coupled to its own antenna (e.g., Wi-Fi antenna 168, Bluetooth antenna 169). The cellular modem 160 is typically configured for communication with one or more cellular networks, such as a GSM network for data and voice communications within a single cellular network, between cellular networks, or between the mobile computing device 100 and a public switched telephone network (PSTN).

The mobile computing device 100 can further include at least one input/output port 170 (which can be, for example, a USB port, IEEE 1394 (FireWire) port, and/or RS-232 port) comprising physical connectors 172, a power supply 174, a satellite navigation system receiver such as a GPS receiver 175. The GPS receiver 175 can be coupled to a GPS antenna 179.

Figure 2:
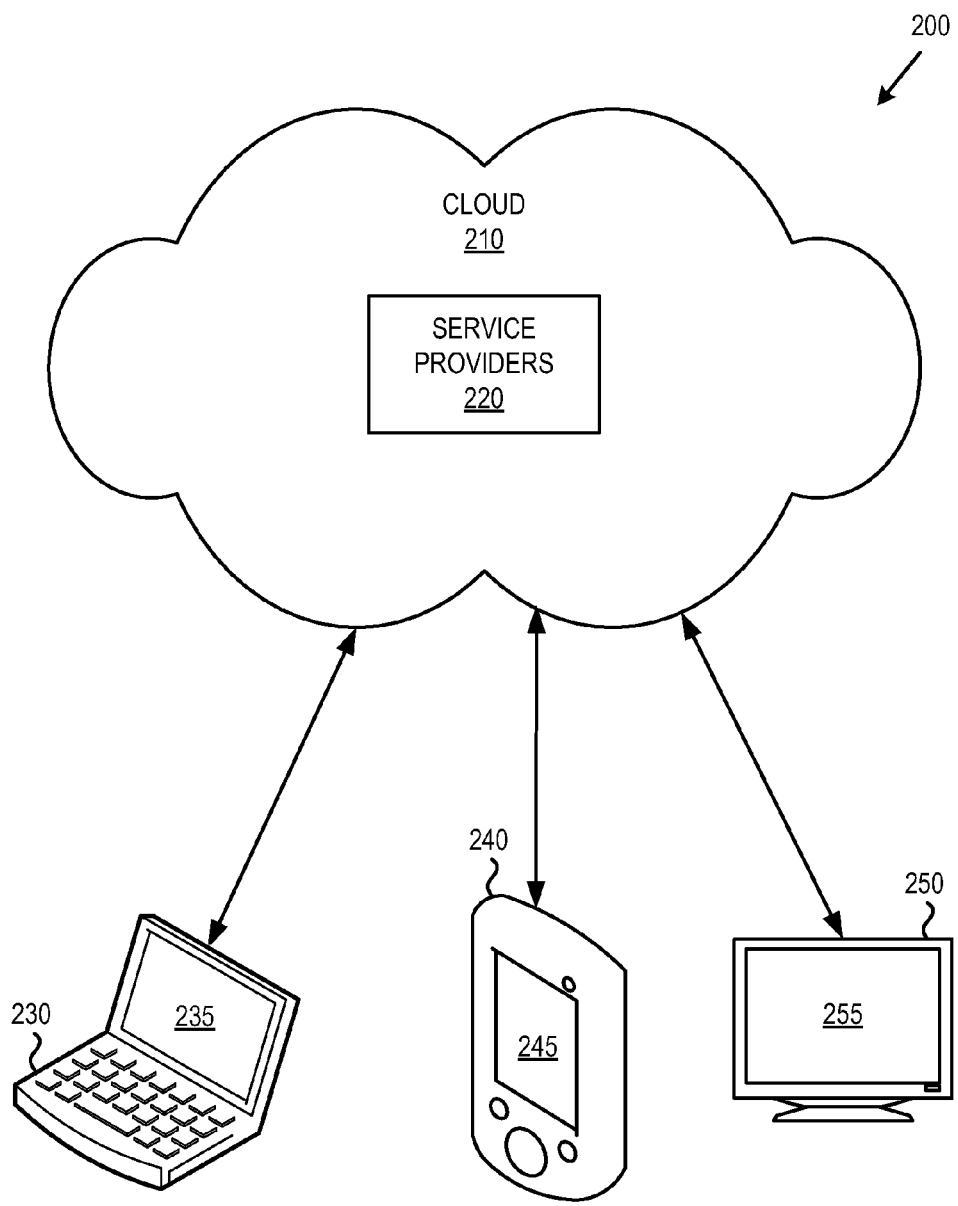
FIG. 2 illustrates a generalized example of a suitable implementation environment in which described embodiments, techniques, and technologies may be implemented.

The illustrated components 105 are not required or all-inclusive, as any components can be deleted and other components can be added. Generally, as used herein, the term "computer" can refer to any computing device (mobile or otherwise) described or mentioned herein. FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a mobile computing device with a mobile computing device screen 245 (e.g., a small-size screen). For example, connected device 240 could be a mobile phone, smartphone, personal digital assistant or the like. Connected device 250 represents a device with a large screen 255. For example, connected device 250 could be a television with Internet connectivity, or a television connected to another device capable of connecting to the cloud such as a set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking and website hosting. The service providers can host online marketplaces offering wide varieties of goods and services such as software applications and application or operating system upgrades (including memory manager upgrades) and media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Although a mobile computing device 100 has been described, the methods described herein can be performed by any computing device, including those generally not considered mobile devices, such as desktop computers and servers. Such non-mobile computing devices can operate in the computing environment of FIG. 2.

Figure 3:
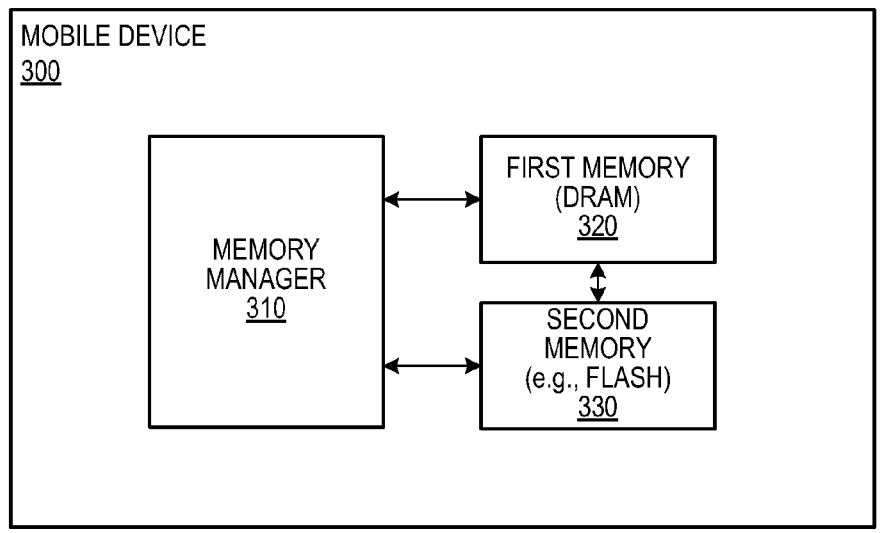
FIG. 3 is a block diagram of an exemplary memory system of a mobile device configured to perform the methods described herein.

FIG. 3 is a block diagram of an exemplary memory system 300 of a mobile device configured to perform the methods described herein. The memory system 300 comprises a memory manager 310, a first memory 320 and a second memory 330. The first memory 320 is generally the main system memory of the mobile device and is typically implemented with volatile DRAM memory, and the second memory 330 is typically a memory with a higher capacity and slower access times than the first memory 320. The second memory is typically implemented with a flash memory. Using the methods described herein, the second memory 330 can act as an expansion of the first memory 320 to accommodate memory requirements of software applications or the operating system executing on the mobile device.

A mobile device memory system can comprise any combination of the removable, non-removable and external memories discussed above in regards to FIG. 1. In one embodiment, the first memory 320 can be a volatile non-removable RAM (e.g., SRAM or DRAM) and the second memory 330 can be a larger, non-removable non-volatile flash memory. The first memory 320 and the second memory 330 can comprise multiple memory components or devices. For example, the first memory 320 can comprise multiple stand-alone RAM chips or modules embedded in the mobile device, or RAM circuitry integrated into any mobile device processor or controller. In other embodiments, the second memory can comprise removable or external non-volatile memory.

The memory manager 310 can be implemented as part of a mobile device operating system and is responsible for handling memory requests from software applications or the operating system, paging memory pages into and out of the first memory, determining when memory pages need to be evicted from the first memory in order to service a memory request, determining and maintaining memory page eviction costs and performing other functions related to memory paging described herein. Although memory pages are typically fixed in size, in some embodiments, they can be of varying size.

Figure 4:
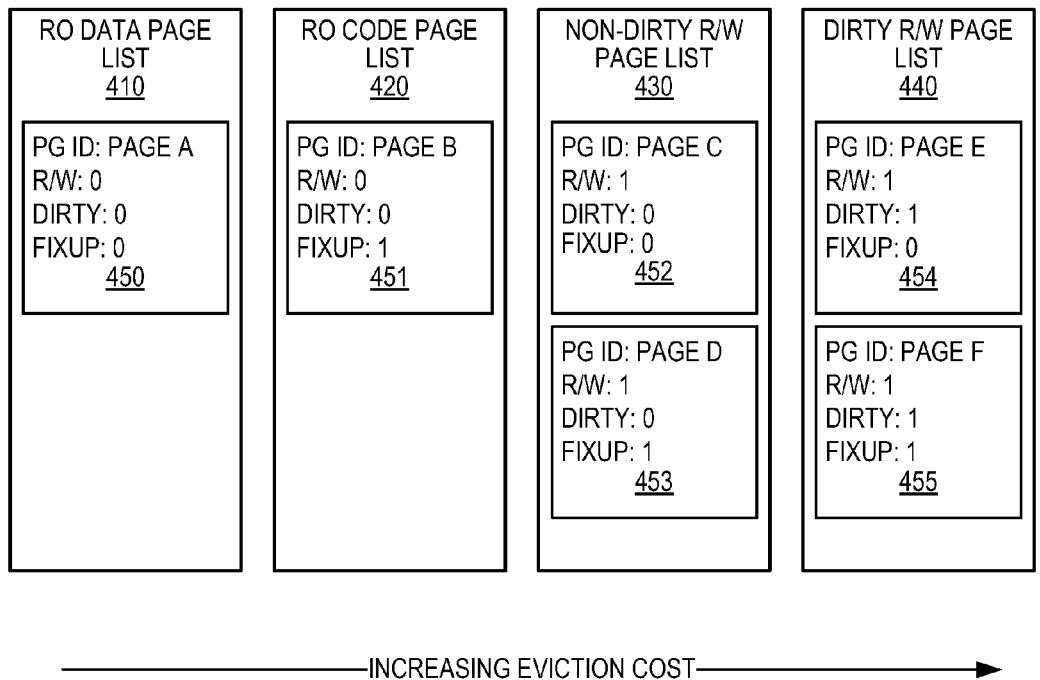
FIG. 4 illustrates a set of exemplary page lists for maintaining eviction priorities of memory pages stored in a first memory of a mobile computing device.

FIG. 4 illustrates a set of exemplary page lists for maintaining the eviction priority of memory pages stored in a first memory of a mobile computing device. In this embodiment, eviction priority is maintained through four memory page lists. In order of increasing eviction costs for the memory pages stored in the page lists, the four lists are a read only (RO) data page list 410, a RO code page list 420, a non-dirty read-write (R/W) list 430 and a dirty R/W page list 440. "Read only" (RO) and "read/write" (R/W) are designations that indicate a level of protection for a memory page. A mobile device is configured to allow contents of a R/W page to be altered but to not allow contents of a RO page to be altered. The protection level of a page can be changed (e.g., a RO page can become a (non-dirty or dirty) R/W page, and a R/W page can become a RO page).

As used herein, the term "eviction cost" generally refers to the cost of evicting a memory page from a first memory. Evicting a page from the first memory can comprise writing contents of the page back to the second memory, if the page contents have changed, and changing the designation of the portion of the first memory storing the evicted page to free. The eviction cost for a memory page can include page-in costs and page-out costs. Paging in is the copying of a memory page from a second memory to a first memory, and paging out is the copying of a memory page from the first memory back to the second memory. Paging out can comprise tracking metadata of memory pages after they are written to the second memory.

Page-in costs can include the cost of reading a page from the second memory when the page is needed again (read cost), the cost of fixing code symbols when a code page is paged in (fixup cost) and the cost of decompressing the contents of a page when a compressed page is read back again (decompression cost). Page-out costs can include the cost of writing a page back to the second memory (write-back cost) and the cost of compressing page contents as part of writing a page back to memory (compression cost). Eviction costs are generally measured by the amount of time it takes to perform various tasks (e.g., flash memory read/write times, page compression/decompression time), although other measures or combinations of measures could be used. Eviction costs can also be based on the priority of a process associated with a memory page, a probability that the page will be accessed while in first memory (access probability) and how recently the page has been accessed. Eviction priority is based on memory page eviction costs. When memory pages are evicted from the first memory, memory pages are generally evicted in order of increasing eviction costs. That is, memory pages having lower associated eviction costs have higher eviction priority.

Memory pages included in the read only (RO) page lists 410 and 420 generally have lower eviction costs (higher eviction priority) than those of R/W memory pages, as the RO pages do not need to be written back to the second memory and are simply discarded when evicted. The memory manager can discard a memory page from the first memory by designating the portion of the first memory storing the evicted RO pages as being free. In some embodiments, when a page is paged into the first memory, the page is designated as a RO page. Some pages, such as data pages, can have their designation changed from RO to R/W if the page is written to while in first memory. Some pages, such as code and resource pages cannot have their designation changed. In various embodiments, a memory page can be given either a R/W or a RO designation when the page is paged in.

The eviction cost of a RO data or code page comprises a read cost, page-in cost, that can be a fixed cost or a variable cost based on the size of the memory page. If the second memory is a flash memory, the read cost can be based on the flash memory read access time. The read cost can be an estimated flash read access time to read in a page of a representative size (e.g., average memory page, worst-case memory page size) or an estimated read access time based on the actual size of a memory page to be read in. There are no write-back costs associated with RO data or code pages.

The RO data page list 410 comprises pages whose RO designation may not be changed while stored in the first memory, such as resource and code pages, and pages that have maintained their initial RO designation (i.e., pages that have not yet been written to) since being paged in. Resource pages are memory pages that include data such as icon data, constant strings, bitmaps and the like associated with a software module.

The RO code page list 420 lists pages that contain computer-executable instructions. RO code pages can comprise symbols, variables and references (hereinafter collectively referred to as "symbols") that are resolved when a code page is loaded into the first memory. For example, instructions in a code page can contain addresses that comprise a base address plus an offset, the base address being determinable when the code page is read into the first memory. Thus, the eviction cost for a RO code page includes a fixup cost associated resolving or "fixing up" these symbols upon page-in. Fixup costs can vary from page to page depending on the size of the page and the number of symbols in the code page. Because data pages typically do not have symbols that need to be resolved when the data page is read into the first memory, eviction costs of RO code pages are typically greater than those of RO data pages.

The non-dirty R/W page list 430 includes memory pages designated as R/W pages, but whose contents have not changed since the page was paged in. A page can transition from the RO data page list 410 to the non-dirty R/W page list 430 if the protection level of the page is changed from RO to R/W. Alternatively, a memory page can be designated as a R/W page upon being paged in, in which case the page is added to the non-dirty R/W page list 430 upon page-in. Typically, the list 430 comprises data pages but it can also comprise code pages. The eviction cost of a non-dirty R/W page includes a read page-in cost, and a fixup cost if the page is a code page. Although RO pages and non-dirty R/W pages can have similar eviction costs (but could vary due to varying compression costs, etc.), keeping track of RO and non-dirty R/W pages in separate page lists can be advantageous for reasons other than maintaining eviction priority. For example, maintaining separate page lists allows the mobile device to provide an appropriate response to a write fault to the two page types. The result of a write fault on a RO page can result in the operating system determining that there has been a memory access violation, and a write fault on a R/W page can result in the operating system determining that memory pages from the second memory are to be paged into the first memory, and that there is no memory access violation.

The dirty R/W page list 440 includes pages designated as R/W pages and whose contents have been altered since the page was paged in. A page can be moved from one of the RO lists 410 or 420 to the dirty R/W page list 440 as the result of a write operation to the page that alters the page contents. A page can be moved from the non-dirty R/W list 430 to the dirty R/W list 440 in response to a write that causes the contents of the page to change (e.g., a previous write did not change the contents of the page or the page was placed into the list upon being paged in). The eviction cost of a R/W page comprises a read cost (a page-in cost) and a write-back cost (a page-out cost). The write-back cost can be, for example, a fixed cost that represents costs associated with writing a typical page back to memory, or a variable cost that takes into account the size of the page. Typically, there are no fixup costs associated with a dirty R/W page as the list 440 generally includes only data pages. However, eviction costs for a R/W page can include fixup costs if the page is a code page.

The page lists 410, 420, 430 and 440 can comprise memory page entries associated with the memory pages stored in the first memory. Generally, a memory page entry is a collection of data corresponding to a memory page. FIG. 4 illustrates exemplary memory page entries 450-455 for memory pages A-F. The memory page entries comprise R/W, dirty and fixup status bits along with a page identifier (PG ID) field. Memory page entry 450 in list 410 is associated with page A, a RO data page, memory page entry 451 is associated with page B, a RO code page; memory page entries 452 and 453 in list 430 are associated with non-dirty R/W data page C and code page D, respectively; and memory page entries 454 and 455 in list 440 are associated with R/W data page E and code page F, respectively. As described above, the R/W bit indicates whether a memory page is a RO or R/W page, the dirty bit indicates whether the contents of a page have been altered since the page was paged into the first memory, and the fixup bit indicates whether the page has symbols that are fixed or resolved when the page is next paged in. The page ID field can contain data related to the memory page such as the size, start and end addresses of the memory page, a text description of the page, an indication of the page type (i.e., code, data, resource) and the like.

The lists 410, 420, 430 and 440 can be implemented in any appropriate data structure. The lists can be updated as memory pages are paged in or paged out from the first memory, as an event that changes the designation of a memory occurs (e.g., a write to a RO page), the priority of a process associated with a memory pages changing and the like. If read, write-back or fixup costs are variable, the memory pages within a list can have varying eviction costs and the memory pages within a list can be sorted by eviction cost. Memory pages within a page list can be sorted according to eviction costs whenever a memory page is added or removed from a list, on a periodic or other time basis, or at any other time.

Figure 5:
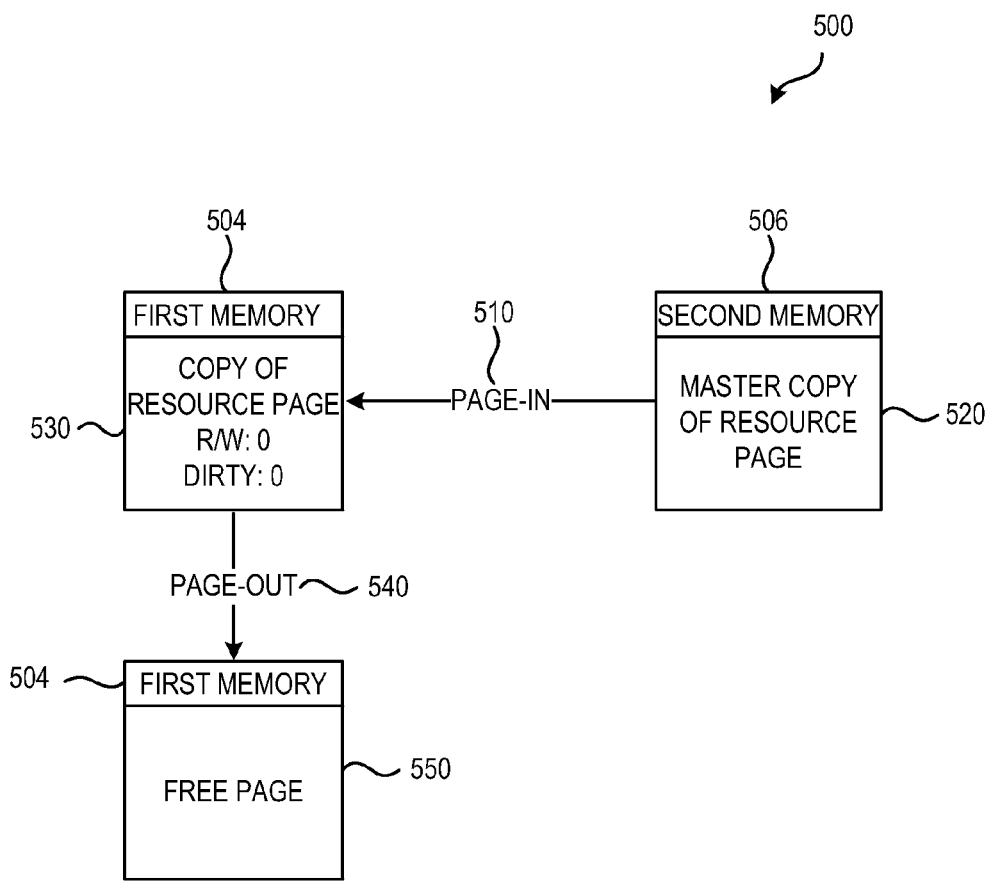
FIG. 5 is an exemplary transition diagram for a read only resource page.

FIG. 5 shows an exemplary transition diagram 500 for a RO resource memory page. As the result of a page-in operation 510, a master copy 520 of a resource page in a second memory 506 is read into a first memory 504. The memory manager designates a copy of the resource page 530 in the first memory as a RO page by setting a R/W bit and a dirty bit, two status bits associated with the memory page, to zero. As part of evicting the resource page from the first memory, a page-out operation 540 is performed, which causes the memory manager to designate the portion of the first memory 504 storing the resource page to be a free page 550.

Figure 6:
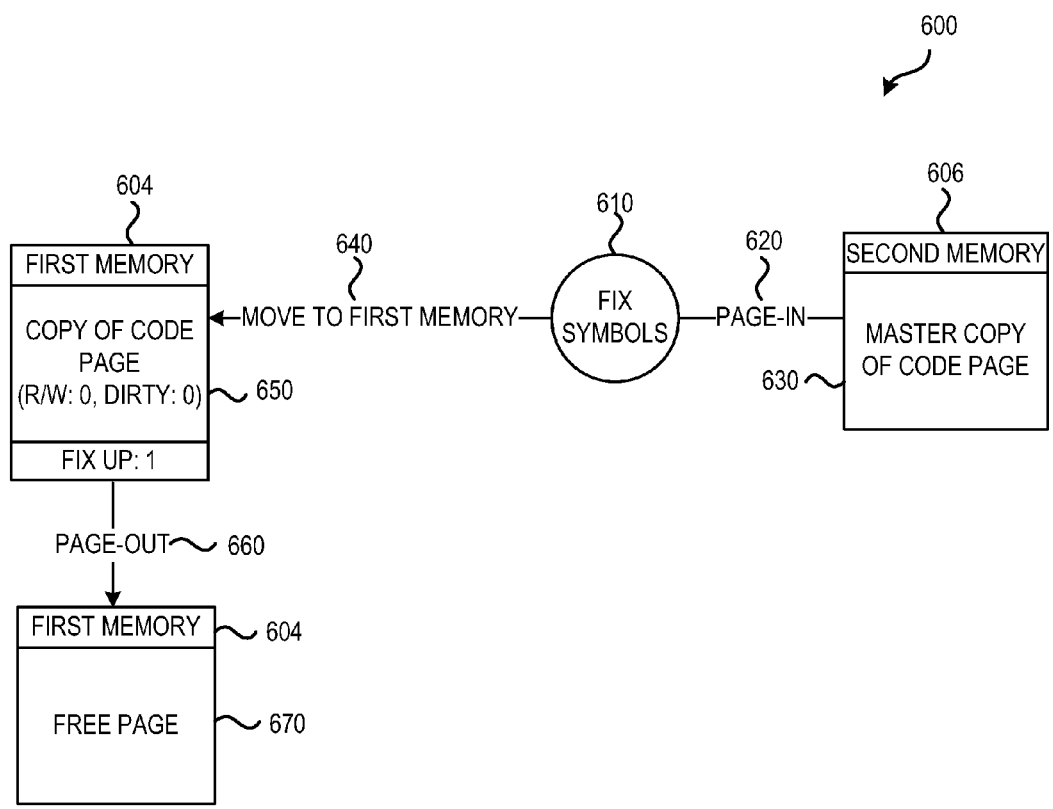
FIG. 6 is an exemplary transition diagram for a read only code page.

FIG. 6 shows an exemplary transition diagram 600 for a RO code page. The diagram 600 is similar to diagram 500 but with the addition of the "fix symbols" operation 610. As the result of a page-in operation 620, a master copy of a resource page 630 in a second memory 606 is provided as input into the "fix symbols" operation 610. At 640, the output of the fix symbols operation 610, a code page with its symbols fixed or resolved, is moved to a first memory 604. The memory manager designates the copy of the code page 650 in the first memory 604 as a RO page by setting the R/W and dirty status bits to zero. The memory manager designates the code page as having associated fixup page-in costs by setting a fixup status bit to one. The fixup status bit can be set based on the page type of a paged-in page (e.g., code or data page) or a determination of whether the code page actually contains symbols that need fixing (e.g., as a result of scanning the page for symbols upon page-in). A fixup cost can be a fixed value such as an estimated fixup cost for resolving symbols in a typical code page, or variable depending on the size of the code page or the number of symbols in a particular code page. As part of evicting the code page 650 from the first memory 604, a page-out operation 660 is performed that causes the memory manager to designate the portion of the first memory 604 storing the resource page to be a free page 670.

A page can be designated as a code or data page, for example, based on the process that issued the memory request that caused the memory manager to determine that one or more memory pages needs to be read in from the second memory 606. For example, a memory request to fetch an instruction for an executing application can cause a memory page being read into the first memory 604 to be designated as a code page.

Figure 7:
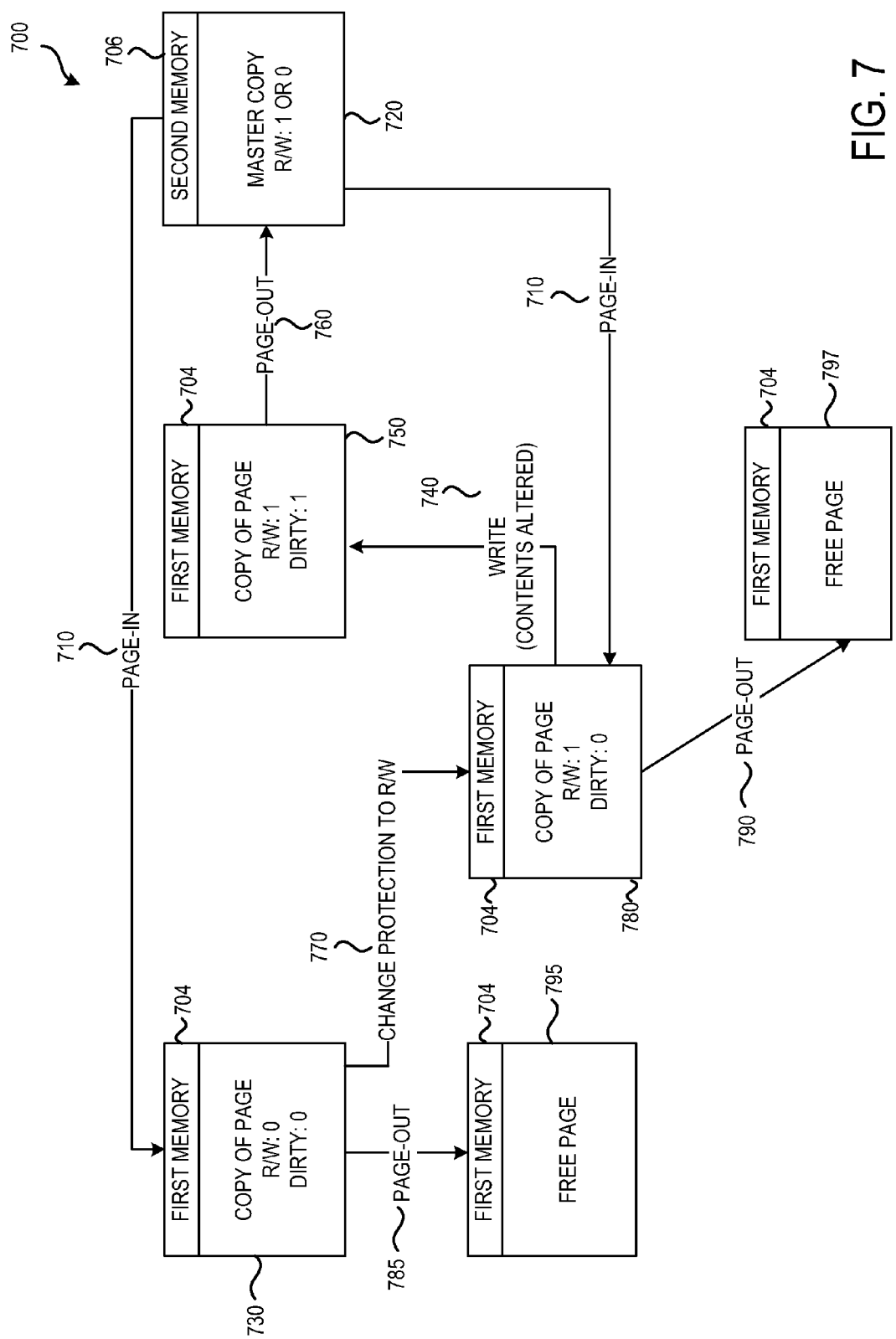
FIG. 7 is an exemplary transition diagram for a page capable of being designated as a read/write page while in the first memory.

FIG. 7 shows an exemplary transition diagram 700 for a memory page capable of being designated as a R/W page while in the memory. As the result of a page-in operation 710, a master copy of the page 720 in a second memory 706 is read into a first memory 704. If the master copy of the page 720 in the second memory 706 is designated as a RO page, then the memory manager designates the copy of the page 730 in the first memory 704 as a RO page by setting the R/W and dirty status bits associated with the page to zero. Otherwise, if the master copy of the page 720 in the second memory 706 is a R/W page, then the memory manager designates the copy of the page 780 in the first memory 704 as a non-dirty R/W page by setting the R/W bit to one and setting the dirty status bit to zero. In response to a write operation 740 that alters the page contents of the page 780 (the modified contents of page 780 being stored in the first memory 704 as 750), the memory manager changes the page designation from non-dirty R/W to dirty R/W by setting the dirty bit to one. A page-out operation 760 causes the modified page 750 to be written back to the second memory 706. In response to an operation 770 that changes the protection level of the page from RO to R/W and does not alter the contents of the memory page 730, the memory manager changes the page designation from RO to R/W by setting the R/W bit to one, but leaves the page marked as "not dirty" by leaving the dirty status bit set to zero. Page-out operations 785, 790 on corresponding unmodified pages 730 or 780 cause the location in the first memory 704 storing the page to be made available as free pages 795, 797, respectively.

Figure 8:
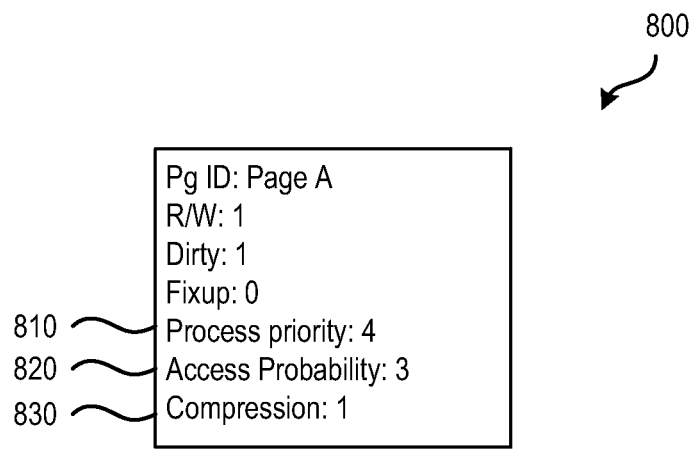
FIG. 8 is a diagram of an exemplary memory page entry.

FIG. 8 illustrates an exemplary memory page entry 800 containing additional information that can be used in determining the eviction cost of a memory page. The memory page entry 800 is a page entry for a dirty R/W data memory page (R/W and dirty status bits are set to 1, and the fixup bit is set to 0) and contains a process priority field 810, an access probability field 820 and a compression field 830. The priority field 810 indicates the priority of a process associated with the memory. The higher the priority of the process associated with a memory page, the higher the eviction cost associated with the page. Thus, pages associated with higher priority processes are generally retained in the first memory longer than pages associated with lower priority processes as lower priority process memory pages are generally evicted earlier. Accordingly, process priorities provide a mechanism by which a user, a mobile device provider, independent software vender (ISV) or other entity can exert a level of control over how often pages associated with operating system processes or software applications are evicted from the first memory.

As retaining memory pages associated with a process in first memory can provide for quicker process responsiveness to user inputs or instructions from other processes, establishing process priorities allows control over mobile device user experiences. For example, certain processes can be given a high priority in order maintain a high level of responsiveness. For instance, processes associated with emergency features of a mobile device can be assigned a high priority so that that these features generally respond quickly when invoked, even though many pages have been swapped in and out of the first memory since the feature was last invoked. Typical high priority features include placing phone calls, calling 911 or other emergency features, or text messaging. Processes associated with other features for which a quick responsiveness is desirable and to which a high priority can be assigned include, for example, bringing up a mobile device's home screen in response to a user hitting a "home" button, bringing up a password screen to unlock a smartphone that has been sleeping or hibernating in response to a user tapping a touchscreen display, or responding to an incoming phone call. Process priorities can be set by a mobile device provider, application or operating system provider and can be fixed or user-configurable. Additional information can be included in a memory page entry and used in determining a page's eviction cost, such as the last time the memory page was accessed.

In some embodiments, process priorities are dynamic and can change while a page is stored in the first memory. For example, a process priority can be increased when a process is moved from the background to the foreground of a mobile device, and can be decreased when a process is moved back to the background. Generally, one application or operating system component (and associated processes) operates in the foreground at any given time and is characterized as the application or operating system component currently selected to receive user input. That is, the foreground application or operating system component is that which is associated with graphical user interface components that are the current focus on the mobile computing device. The process priority can be a binary value (e.g., zero for low priority and one for high priority) or a multi-bit value, such as shown in 810, illustrating a priority "7" associated with page A indicating either a relatively high or relatively low priority depending on a range of available values. For example, if priority values restricted to 3 bits (priorities 0, 1 ... 7), a "7" would be a highest priority. If priorities were restricted to six bits, a "63" would be a highest priority.

The access probability field 820 represents a probability or a rate at which a memory page will be accessed while in the first memory. The access probability can be based on actual page access metrics, such as the frequency at which the page has been accessed since being paged-in, within a recent time period, etc. Alternatively, the access probability can be a value that represents an estimated access probability based on a process, software application, operating system component or feature, etc. The greater the access probability of a memory page, the greater the page's eviction cost. Thus, memory pages that are accessed more often are generally retained in the first memory longer than pages having lower access probabilities.

The compression field 830 indicates whether a memory page (or a portion of it) is to be compressed when it is written back to flash memory or other second memory. The compression field indicates that at least some portion of the page will be compressed when the page in written back to the second memory. Thus, the compression field can indicate that there are compression and decompression costs associated with a memory page. The compression value can be a binary value indicating whether a page will be compressed during writeback or a multi-bit field to allow for variable compression/decompression costs that reflect, for example, the size of the memory page to be compressed, various compression/decompression algorithms that could be used for different pages, and the like.

Memory page entries used by the methods described herein can contain different information on a page-by-page basis. For example, memory page entries for RO pages may not contain a compression field as these pages are not written back to the second memory when they are evicted. Fields can be added (or removed) to a memory page entry if a page moves between various page lists or in response to other events. For example, if a RO data page becomes a R/W page, a compression field can be added to the corresponding memory page entry.

Eviction costs for memory pages can be determined in a variety of ways. Eviction costs can be based on all or a portion of the information contained in a memory page entry. The amount of information used in determining the eviction cost for a memory page can vary from page to page, can be the same for all memory pages stored in the first memory, or can be the same for at least the pages in one of the memory page lists. In some embodiments, all pages in a page list are considered to have the same eviction costs. In such cases, eviction costs may not be determined for any of the individual pages in a list, and memory pages can be evicted according to which page lists have the lower eviction costs. In various embodiments, eviction costs are calculated for the individual memory pages stored in the first memory.

When memory pages are to be evicted from the first memory in order to create enough free memory to satisfy a memory request, the eviction priority for the pages is based on the eviction costs associated with the memory pages. In general, memory pages having lower eviction costs are evicted before memory pages have higher eviction costs. In one exemplary eviction policy, memory pages are evicted based on the associated page list. For example, if eviction costs are maintained using the four page lists 410, 420, 430 and 440, memory pages contained in the RO data page list 410 are evicted first as RO data pages have the lowest eviction cost. If evicting the memory pages in the list 410 does not create enough free memory to satisfy the memory request, the memory manager can evict memory pages from page lists in increasing eviction cost order (first evicting pages from the RO code page list 420, then the non-dirty R/W page list 430, and then the dirty R/W page list 440) until sufficient memory is freed. In this eviction policy, in which all pages in a list are considered to have the same eviction cost, individual pages within a memory page list can be evicted in order of increasing memory page size, in an arbitrary order, in an order in which the pages are arranged in a data structure, or in any other order.

When a memory page is evicted from the first memory, the corresponding memory page entry can be removed from the memory page list to which it belonged. Information about memory pages can continue to be maintained by the memory manager after a page has been evicted. For example, the memory manager can maintain a memory page database that keeps track of information about memory pages that have been written back to flash memory. The memory page status can be updated when a page is written back to flash memory. For example, a dirty R/W page can be designated as a non-dirty R/W page upon being written back to flash memory.

Although the page lists provide a framework for sorting memory pages by eviction costs, in some situations (e.g., where eviction costs are calculated for individual memory pages) memory pages having the highest eviction costs within a given list can have eviction costs greater than the lowest eviction cost memory pages in other page lists. For example, the highest eviction cost memory pages in the RO data page list 410, which could be associated with high priority processes, could have eviction costs greater than the lowest eviction costs memory pages in the RO code page list. Various eviction policies can be used to handle this situation. For example, one eviction policy could evict all of the memory pages in a lower eviction cost page list before evicting any pages in the next-higher eviction cost page list, in which case a memory page could be evicted that has an eviction cost greater than a memory page not evicted. Alternatively, the memory manager can evict memory pages having the lowest eviction costs across one or more of the page lists, regardless in which page list the memory pages are stored.

In another eviction policy, eviction costs can be determined for individual memory pages within a list and memory pages can be evicted in the order of increasing eviction costs within a page list. The individual page lists can be sorted by eviction costs as memory pages are paged-in, paged-out, moved between page lists, information within the memory page entries changes (e.g., a change in process priority in response to a process associated with a memory page moving from the foreground to the background) or at any other time. Alternatively, the page lists can be kept non-sorted, in which case the memory manager can scan a page list for a memory page with the lowest eviction costs in the page list, evict that page, remove the evicted page from the page list, and repeat the process until sufficient memory is freed.

In yet another eviction policy embodiment, memory pages in a page list can be evicted according to a two-pass scheme. In this scheme, memory page entries can have a flag indicating that the memory page has a higher eviction cost relative to a non-flagged memory page. The flag can be set if the memory page is associated with a high priority process (priority flag), will be compressed upon write-back (compression flag) or has any other characteristics that gives it a higher eviction cost. During eviction, in a first pass of the page list, the memory manager evicts memory pages that are not flagged, and evicts the flagged pages after the non-flagged pages have been evicted. In various embodiments, multiple flags can be used and more than two passes can be used to evict pages. For example, in a first pass, non-flagged memory pages can be evicted, in a second pass memory pages with a compression flag set can be evicted, and in a third pass memory pages associated with a high priority process can be evicted.

The various factors that can be included in calculating the eviction cost for a page can be given various weights in order to implement various eviction policies. For example, process priority can be given a greater weighting than whether a page is dirty to generally keep memory pages associated with higher priority processes from paging out before dirty pages.

In some embodiments, more or fewer page lists than the four page lists shown in FIG. 4 can be used to keep track of memory page eviction priority. For example, a single RO memory page list can be used in place of the two RO page lists 410 and 420 or a single R/W page list can be used in place of the two R/W page lists 430 and 440. In another example, a separate page list can be used to keep track of memory pages meeting certain page criteria. For example, a high priority memory page list can include memory pages associated with high priority processes, such as pages that have a single priority status bit set to one, or pages that have a process priority above a certain priority threshold. In yet another embodiment, the memory page entries can be kept in a single page list.

Figure 9:
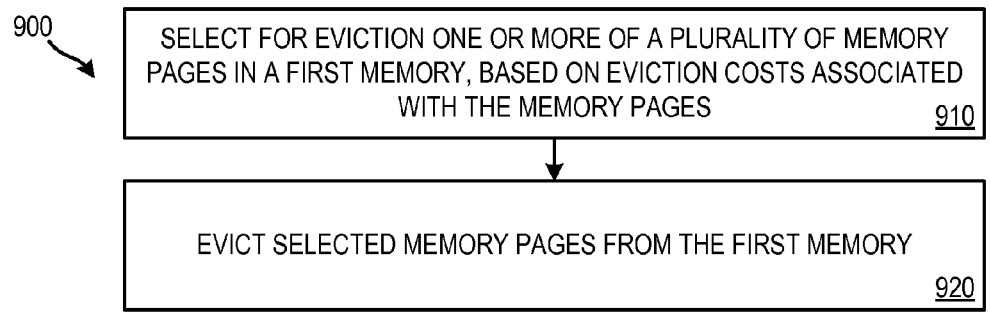
FIG. 9 is a flowchart of an exemplary method of evicting memory pages from a first memory of a mobile computing device.

FIG. 9 shows a flow chart of an exemplary method 900 of evicting memory pages from a first memory. The exemplary method 900 can be performed by the memory manager of a smartphone containing 512 MB of main DRAM memory and 32 GB of flash memory. The DRAM may be full (no free memory remains). At 910, one or more of a plurality of memory pages stored in a first memory are selected for eviction based on eviction costs associated with the memory pages. In the example, the DRAM is the first memory and the memory manager selects several memory pages for eviction from the DRAM based on eviction costs associated with memory pages stored in DRAM. At 920, the selected memory pages are evicted from the first memory. In the example, the memory manager evicts the selected memory pages from DRAM.

In some embodiments of the method 900, the eviction costs associated with the selected memory pages are less than or equal to the eviction costs associated with one or more second memory pages not evicted from the first memory. In the example, the memory manager selects memory pages have eviction costs lower than the memory pages not selected for eviction. For example, consider the situation where the smartphone DRAM contains one RO data page, two RO code pages and the remainder of the DRAM is filled with R/W pages. The memory manager can select memory pages for eviction by eviction costs, and first selects the one RO data page, the data page having the lowest eviction cost. If evicting the RO data page alone does not free up enough memory, for example, to satisfy a memory request, the memory manager selects one of the two RO code pages. Evicting one of the RO code pages creates enough free memory to accommodate the read request.

In some embodiments, the exemplary method 900 can further comprise maintaining a plurality of memory page lists comprising a plurality of memory page entries associated with the memory pages. The memory page entries in these embodiments comprise a priority flag. The page lists have associated eviction costs. The selecting comprises selecting memory pages for eviction in order of increasing page list eviction costs, the memory pages in a page list associated with memory page entries in which the priority flag is not set being evicted before memory pages in the page list associated with memory page entries in which the priority flag is set. In the smartphone example, the memory manager can maintain four page lists, a RO data page list, a RO code page list, a non-dirty R/W page list and a dirty R/W page list. The page lists comprise memory page entries containing priority flags. The RO data page list includes a memory page entry for single RO data page, the RO code page list includes the two RO code pages, one in which the priority flag is set and the other in which the priority flag is not set, and the remainder of the memory pages in the first memory are included in the two R/W page lists. After selecting RO data pages and moving to the RO code page list, the memory manager first selects memory pages for eviction associated with page entries in which the priority flag is not set.

One exemplary advantage of the eviction priority methods described herein is that by delaying eviction of dirty memory pages, memory pages with high access probabilities, or memory pages that have been accessed recently, the number of write-backs to the flash memory is reduced. Reducing the number of flash memory write cycles is beneficial as flash memories generally can undergo a fixed number of write cycles before flash memory integrity is degraded. Reducing the number of flash memory write cycles also becomes increasingly of interest as the memory requirements of mobile device applications and operating systems increase and can no longer fit in mobile device volatile RAM, and as flash memories increasingly replace magnetic disk memories. Delaying eviction of memory pages with higher eviction costs can also increase the responsiveness of software applications and the operating system features, which can result in an improved user experience. Further, by using the flash memory in a mobile device as an extension of the local RAM memory, mobile devices can be provided with a lesser amount of RAM, thus reducing mobile device cost.

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable storage media, such as one or more optical media discs (such as DVDs or CDs), volatile memory components (such as DRAM or SRAM), or nonvolatile memory components (such as flash memory or hard drives)) and executed on a computer (e.g., any commercially available computer, including smart phones or other computing devices that include computing hardware). Computer-readable storage media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while remaining faithful to the concepts described above. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

We claim:

1. A method, comprising:
maintaining a plurality of memory page lists comprising a plurality of memory page entries associated with respective memory pages of a plurality of memory pages located in at least one memory, wherein:
the plurality of memory page lists is associated with a respective plurality of different eviction costs, so that the plurality of memory page lists are arranged based on eviction cost;
at least one of the memory page lists comprises a plurality of memory page entries that are not associated with one or more of the remaining memory page lists, the plurality of memory page entries in the at least one memory page list associated with one of the plurality of different eviction costs; and
at least a portion of the plurality of memory page entries for a corresponding memory page is stored in at least one of the plurality of memory page lists based on eviction cost associated with the corresponding memory page;
selecting one or more of the plurality of memory pages for eviction from a first memory based at least in part on the associated memory page entries, wherein information included in the respective memory page entries represents the eviction cost associated with the corresponding memory page; and
evicting the selected memory pages from the first memory.

2. The method of claim 1, wherein the eviction costs associated with the selected memory pages are less than or equal to the eviction costs associated with one or more second memory pages not evicted from the first memory.

3. The method of claim 1, wherein each of the respective memory page entries comprises a priority flag; and
wherein the selecting comprises selecting memory pages associated with memory page entries in which the priority flag is not set before selecting memory pages associated with memory page entries in which the priority flag is set.

4. The method of claim 1, wherein each of the respective memory page entries comprises a priority flag, wherein the memory page lists have associated eviction costs, and wherein the selecting comprises selecting memory pages in order of increasing page list eviction cost, the memory pages in a page list associated with memory page entries in which the priority flag is not set being selected before memory pages in the page list associated with memory page entries in which the priority flag is set.

5. The method of claim 1, further comprising determining that a portion of the first memory needs to be freed to accommodate a memory request.

6. The method of claim 1, wherein the eviction costs associated with at least one of the selected memory pages are based at least on page-in costs for the at least one selected memory page.

7. The method of claim 6, wherein the page-in costs for the at least one selected memory page is based at least on decompression costs associated with decompressing the at least one selected memory page.

8. The method of claim 6, wherein the page-in costs for the at least one selected memory page is based at least on fixup costs associated with fixing symbols in the at least one selected memory page when the at least one selected memory page is paged back into the first memory.

9. The method of claim 6, wherein the page-in costs for the at least one selected memory page is based at least on read costs associated with paging the at least one selected memory page back in from a second memory, the read costs being based on a size of the at least one selected memory page.

10. The method of claim 1, wherein the eviction costs for at least one of the selected memory pages is based at least on page-out costs for the at least one selected memory page.

11. The method of claim 10, wherein the page-out costs for the at least one selected memory page is based at least on compression costs associated with compressing the at least one selected memory page when the at least one selected memory page is written back to a second memory.

12. The method of claim 1, wherein the eviction costs associated with at least one of the selected memory pages is based at least on a priority of a process associated with the at least one selected memory page, the priority being predetermined.

13. The method of claim 12, wherein the at least one selected memory page comprises one or more read only memory pages, the eviction costs associated with the read only memory pages associated with processes associated with emergency features of a mobile computing device being greater than the eviction costs associated with the read only memory pages not associated process associated with emergency features of the mobile computing device.

14. The method of claim 1, wherein the memory pages comprise one or more read only memory pages and one or more read/write memory pages, the eviction costs associated with the read only memory pages being less than the eviction costs associated with the read/write memory pages.

15. The method of claim 14, the selecting comprising selecting the one or more read only memory pages for eviction before selecting at least one of the read/write memory pages.

16. The method of claim 1, further comprising maintaining at least a read only memory page list, a non-dirty read-write memory page list, and a read-write memory page list that include memory page entries associated with read only memory pages, non-dirty read-write memory pages and dirty read-write memory pages stored in the first memory, respectively.

17. The method of claim 16, wherein the read only memory pages have associated eviction costs less than the eviction costs associated with the non-dirty read/write memory pages, the eviction costs of the non-dirty read/write memory pages being less than the eviction costs associated with the eviction costs of the dirty read/write memory pages.

18. The method of claim 16, further comprising maintaining a high priority page list that includes memory page entries associated with memory pages associated with high priority processes, wherein the memory pages in the high priority page list are the last memory pages to be evicted from the first memory.

19. One or more computer-readable storage media storing computer-executable instructions for causing a mobile computing device to perform a method, the method comprising:
determining that a portion of memory in a first memory needs to be freed to accommodate a memory request, the first memory storing a plurality of memory pages having associated memory page entries in a plurality of memory page lists, the plurality of memory page lists associated with a corresponding plurality of different eviction costs, the respective memory page entries including information describing the associated memory page, the information representing eviction costs based at least on page-in costs for the memory pages or priorities of process associated with the plurality of memory pages, and the plurality of memory page lists arranged in the first memory at least according to eviction cost; and based at least in part on the memory page entries, evicting, from the first memory, one or more of the memory pages from the plurality of memory pages, the evicted memory pages having associated eviction costs less than or equal to eviction costs associated with one or more of the memory pages that are not evicted from the first memory.

20. A mobile computing device, comprising:

a processor;

a memory comprising a first memory and a flash memory;

a memory manager configured to:

page-in a plurality of memory pages from the flash memory into the first memory;

maintain a plurality of memory page lists comprising a plurality of memory page entries associated with the memory pages and comprising a priority flag, the memory page lists having associated eviction costs for the associated memory pages stored in the memory and being arranged in the memory according to eviction cost;

determine that a portion of the first memory needs to be freed in order to accommodate a memory request; and evict memory pages from the first memory until sufficient memory is freed to accommodate the memory request, the evicting comprising evicting memory pages by increasing page list eviction cost, the memory pages in a page list associated with memory page entries in which the priority flag is not set being evicted before memory pages in the page list associated with memory page entries in which the priority flag is set.

* * * * *